(12) United States Patent
Schmid

(10) Patent No.: US 7,374,341 B2
(45) Date of Patent: May 20, 2008

(54) HYDRODYNAMIC BEARING ARRANGEMENT FOR AN ELECTRIC MOTOR

(75) Inventor: Guido Schmid, Triberg (DE)

(73) Assignee: Minebea Co., Ltd., Nagano-ken (JP)

( * ) Notice: Subject to any disclaimer, the term of this patent is extended or adjusted under 35 U.S.C. 154(b) by 252 days.

(21) Appl. No.: 11/205,526

(22) Filed: Aug. 17, 2005

(65) Prior Publication Data
US 2006/0039635 A1 Feb. 23, 2006

(30) Foreign Application Priority Data
Aug. 19, 2004 (DE) .................... 10 2004 040 295

(51) Int. Cl.
*F16C 32/06* (2006.01)
(52) U.S. Cl. ...................... 384/100; 384/107
(58) Field of Classification Search ................ 384/107, 384/112, 121, 123; 360/99.08, 98.07
See application file for complete search history.

(56) References Cited
U.S. PATENT DOCUMENTS
5,433,529 A * 7/1995 Hensel ........................ 384/112
5,988,886 A * 11/1999 Takahashi ................... 384/107
2003/0016891 A1* 1/2003 Gomyo et al. .............. 384/121

OTHER PUBLICATIONS
US 5,794,074, 08/1998, Rahman et al. (withdrawn)*

* cited by examiner

*Primary Examiner*—Thomas R. Hannon
(74) *Attorney, Agent, or Firm*—Cooper & Dunham LLP

(57) ABSTRACT

The invention relates to a hydrodynamic bearing arrangement for an electric motor, particularly for a spindle motor to drive the platters of a hard disk drive. The bearing arrangement comprises a shaft, a bearing bush and a thrust plate disposed fixedly on the shaft, the shaft and the thrust plate rotating with respect to the bearing bush, grooved patterns to generate fluid-dynamic pressure being provided on the thrust plate and/or the surfaces located opposite the thrust plate of the bearing sleeve and/or the cover plate. The grooved pattern comprises a number g of grooves distributed over the surface of the bearing sleeve, the thrust plate or the cover plate, wherein in the shaft and/or in the thrust plate, a number h of holes and/or recesses are provided at the inner edge of the thrust plate and/or at the outer edge of the shaft. According to the invention, the number g of grooves cannot be integrally divided by the number h of holes and likewise that h cannot be integrally divided by g.

7 Claims, 10 Drawing Sheets

Figure 2A:
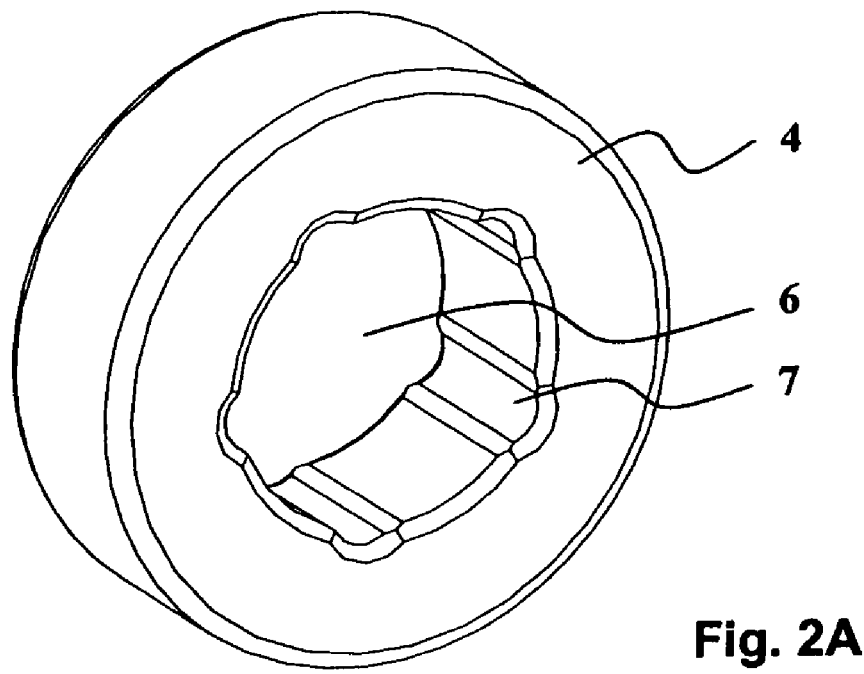

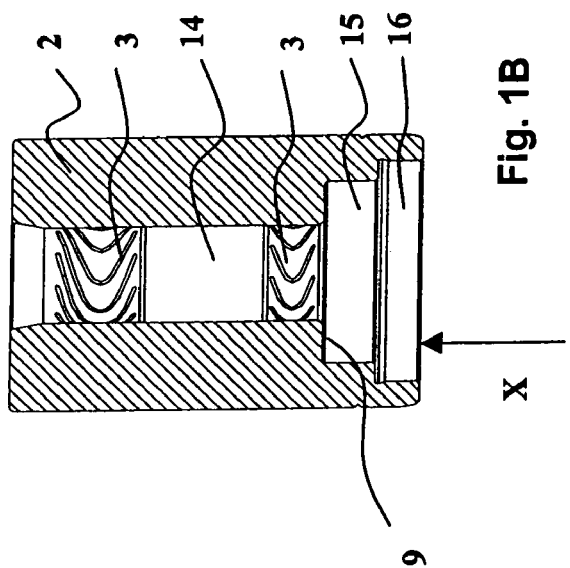
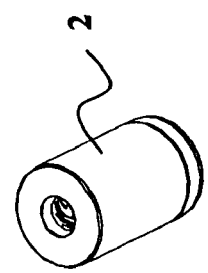
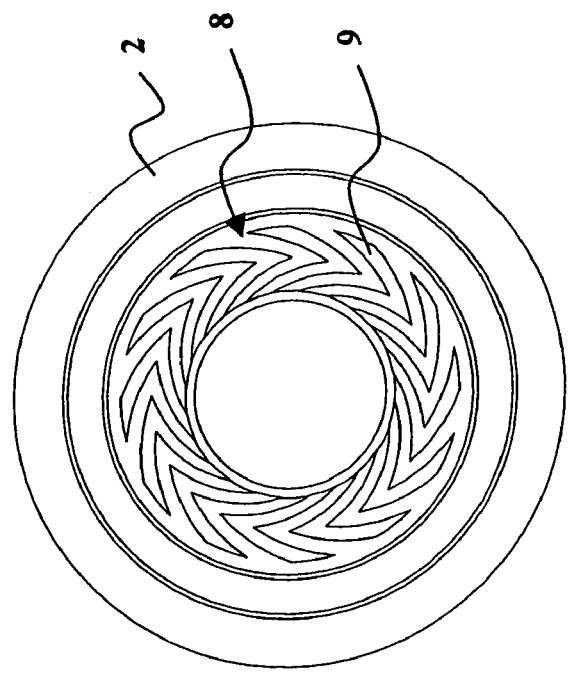
Fig. 1A
Fig. 1B
Fig. 1C

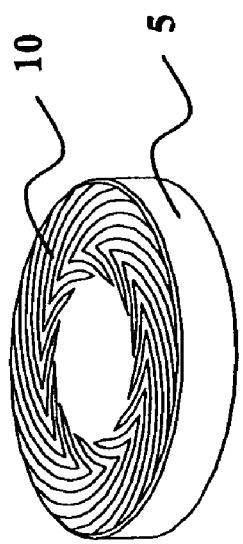
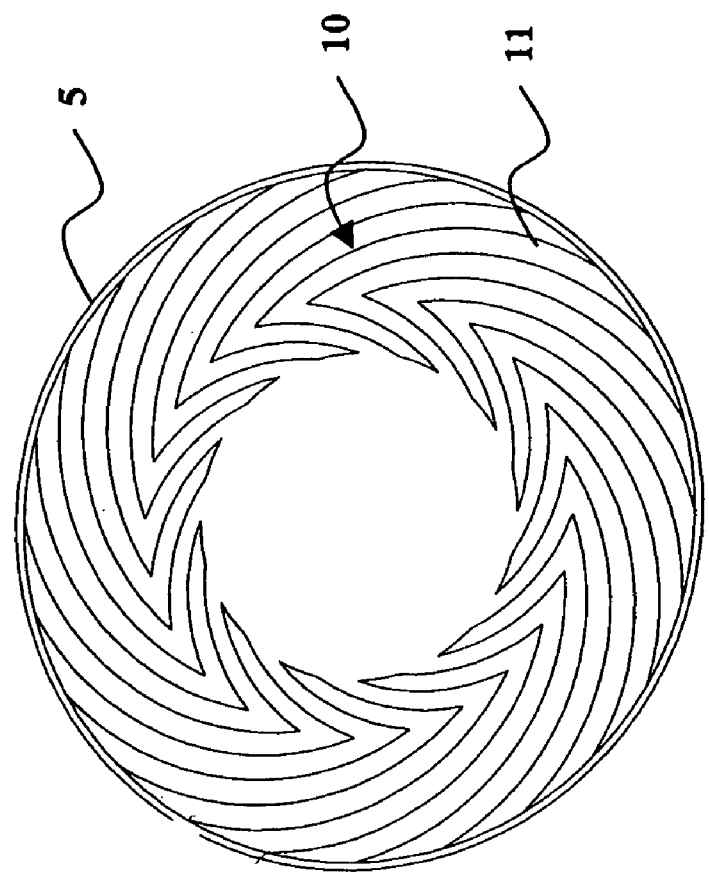
Fig. 4B
Fig. 4A

HYDRODYNAMIC BEARING ARRANGEMENT FOR AN ELECTRIC MOTOR

BACKGROUND OF THE INVENTION

The invention relates to a hydrodynamic bearing arrangement for an electric motor, particularly for a spindle motor to drive the platters of a hard disk drive.

PRIOR ART

Electric motors having fluid bearings, particularly in the form of spindle motors having hydrodynamic bearing systems, are sufficiently well-known and comprise a shaft with a thrust plate shaped like an annular disk disposed on the shaft. The thrust plate and shaft can be designed as separate parts or as an integral piece.

To form a radial bearing, sections on the inside of the bearing bush or sections on the outside of the shaft are provided with a grooved pattern. In addition to the radial bearing, to form an axial bearing, grooved patterns to generate fluid-dynamic pressure are provided on the sides of the thrust plate and/or the axial surfaces located opposite the thrust plate of the bearing sleeve and the cover plate, which acts as a counter bearing. Each grooved pattern consists of the same number g of grooves distributed over the surfaces of the thrust plate or the surface of the bearing sleeve and cover plate. A number h of holes, called recirculation holes, are provided in the thrust plate. As an alternative, recesses can be provided at the inside edge (inside diameter) of the thrust plate and/or at the outside edge (outside diameter) of the shaft. These holes or recesses allow bearing fluid to be exchanged between the two sides of the thrust plate, allowing pressure differences in the bearing fluid between these regions of the axial bearing to be equalized.

For the sake of symmetry and for technical reasons to do with pressure, it has been common practice to date to match the number of recirculation holes to the number of grooves in the grooved pattern. The number g of grooves was chosen so as to correspond to a multiple of the number h of recesses or holes. When this type of motor is then put into rotation, the bearing fluid flowing into the bearing gap is made to vibrate due to the grooved pattern. Depending on the number of revolutions of the motor, these vibrations exist in the audible frequency spectrum and are expressed as noise emission from the bearing system. If a local peak which protrudes distinctly above the adjoining frequency spectrum (e.g. the difference is more than 6 dB), is found in the frequency spectrum at a specific frequency, then this is referred to as a pure tone. For a given number g of grooves, a pure tone is obtained, for example, at a frequency:

$f = g*$revolutions$/60s$, and for integral multiples of $f$.

For a number g of grooves of 12 and a number of revolutions of 15,000 rmin$^{-1}$, a pure tone is produced at the frequency:

$f = 12*15000/60s = 3000$ Hz

The applicant has discovered that this pure tone is particularly strongly pronounced when the number g of grooves is a multiple of the number h of recirculation holes. This is due to the fact that in such a case the recirculation holes coincide exactly with the groove ends, resulting in unfavorable pressure and flow conditions being produced in the bearing gap which lead to a vibration peak. This unpleasant pure tone lying within a human being's range of hearing plays a significant part in the overall noise emission of a fluid bearing motor. Here, it makes no difference whether the bearing bush is stationary and the shaft rotates or vice versa.

SUMMARY OF THE INVENTION

It is therefore the object of the invention to reduce or fully eliminate the noise emission of a hydrodynamic bearing arrangement, particularly the formation of pure tones of a specific frequency, or the formation of system resonances in general.

This object has been achieved according to the invention by the characteristics outlined in patent claim 1.

Preferred embodiments and further beneficial characteristics of the invention are provided in the subordinate claims.

According to the invention, the bearing system is constructed in such a way that the number g of grooves cannot be integrally divided by the number h of recesses or holes and that h likewise cannot be integrally divided by g. This means that the number g of grooves is not an integral multiple of the number h of recesses or holes and vice versa. Due to the "non-symmetric" arrangement and the number of grooves and recirculation holes according to the invention, no large pressure differences are built up in the bearing gap since during the rotation of the bearing no large changes in the gap size between the thrust plate, the cover plate or the thrust plate and the bearing sleeve are created. This means that no distinct pure tone is produced at a frequency of $f = g*$revolutions$/60$ s and the noise emission of the bearing arrangement and thus the entire motor is greatly improved.

In a preferred embodiment of the invention, the number of grooves and the number of recesses or holes are chosen according to the invention so that they do not have a common integral divisor that is greater than 1. This means that the greatest common divisor (GCD) of the natural numbers g and h is the digit 1 (Condition 1).

In another embodiment of the invention, the number of grooves and the number of recesses or recirculation holes can be chosen according to the invention so that additionally the GCD of the pairs of numbers (g+1, h) and (g−1, h) and (g, h+1) as well as (g, h−1) is always 1 (Condition 2).

According to the invention, the number of grooves and the number of recesses or holes are chosen so that at least one of the above conditions, i.e. Condition 1 and/or Condition 2, is met.

Example 1: number of grooves g=12 and number of recesses h=5 meets Condition 1, but not Condition 2

Example 2: number of grooves g=13 and number of recesses h=5 meets Conditions 1 and 2.

In another preferred embodiment, the grooves are evenly distributed over the respective surface of the thrust plate or the bearing sleeve or the cover plate. The recesses are similarly evenly distributed on the inside diameter of the thrust plate or on the outside diameter of the shaft.

As an alternative to recesses in the shaft or in the thrust plate, recirculation holes can be realized in the thrust plate, which, preferably, are evenly distributed on a circular line concentric to the rotational axis of the shaft.

For each bearing system there is an optimal overall cross-section of holes or recesses, firstly, so that if recesses are used, the press-out force of the thrust plate secured to the shaft in a pressfit is not too low, and secondly, to keep the recirculation of the fluid constant. If the number of holes or recesses is changed, the cross-section of the individual holes or recesses must then be adapted so that the overall cross-section does not change.

In addition to the recesses or recirculation holes associated with the region of the axial bearing, such measures could also be provided for the radial bearing regions. For example, holes or channels can be realized in the bearing sleeve or the shaft which connect the two radial bearing regions to one another and/or to the axial bearing region, enabling the bearing fluid to circulate directly between the radial bearing regions and/or axial bearing regions not only via the bearing gap but also via these holes. In order to reduce or fully eliminate the formation of pure tones of a specific frequency or the formation of system resonances in general, in the event that the holes are arranged in the shaft according to the invention, it is essential that the number g' of grooves cannot be integrally divided by the number 2h' of holes and likewise that 2h' cannot be integrally divided by g'. Should the holes be disposed in the bearing sleeve, it is essential that the number g' of grooves cannot be integrally divided by the number h' and likewise that h' cannot be divided by g'.

An embodiment of the invention is described in more detail below on the basis of the drawings. Further features, advantages and characteristics of the invention can be derived from the drawings and their description.

Figure 2B:
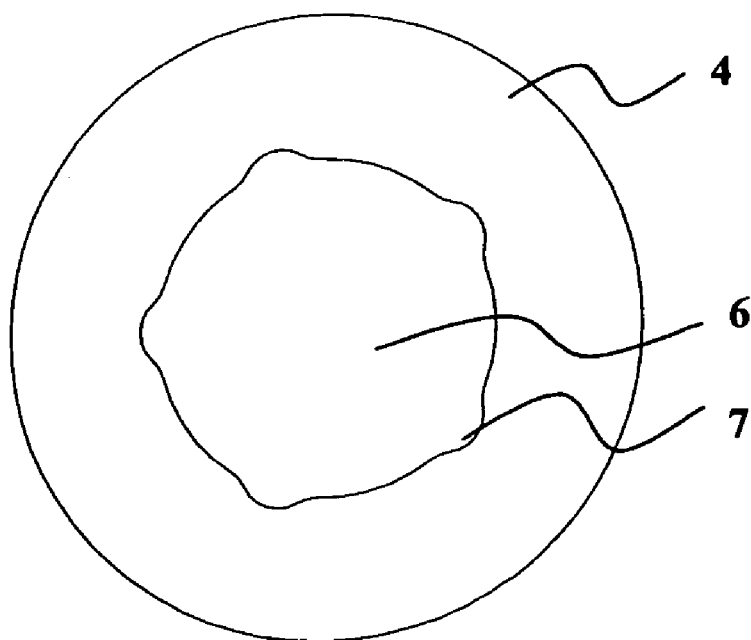
Figure 3A:
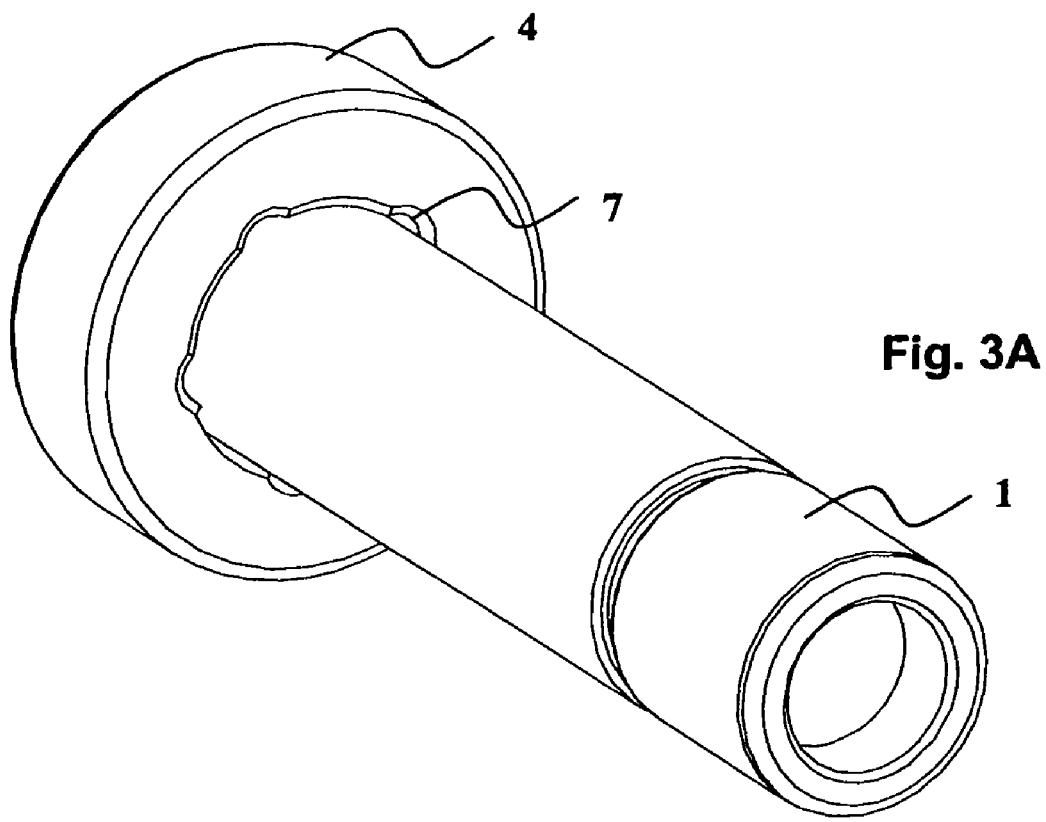
Figure 3B:
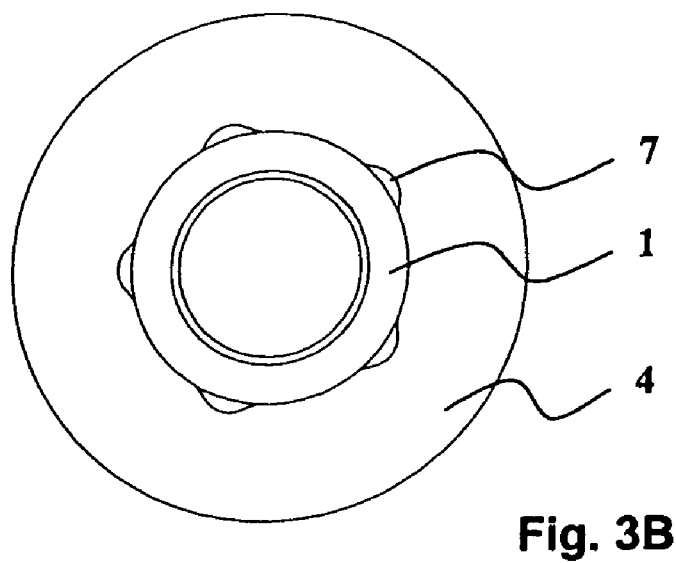
Figure 5:
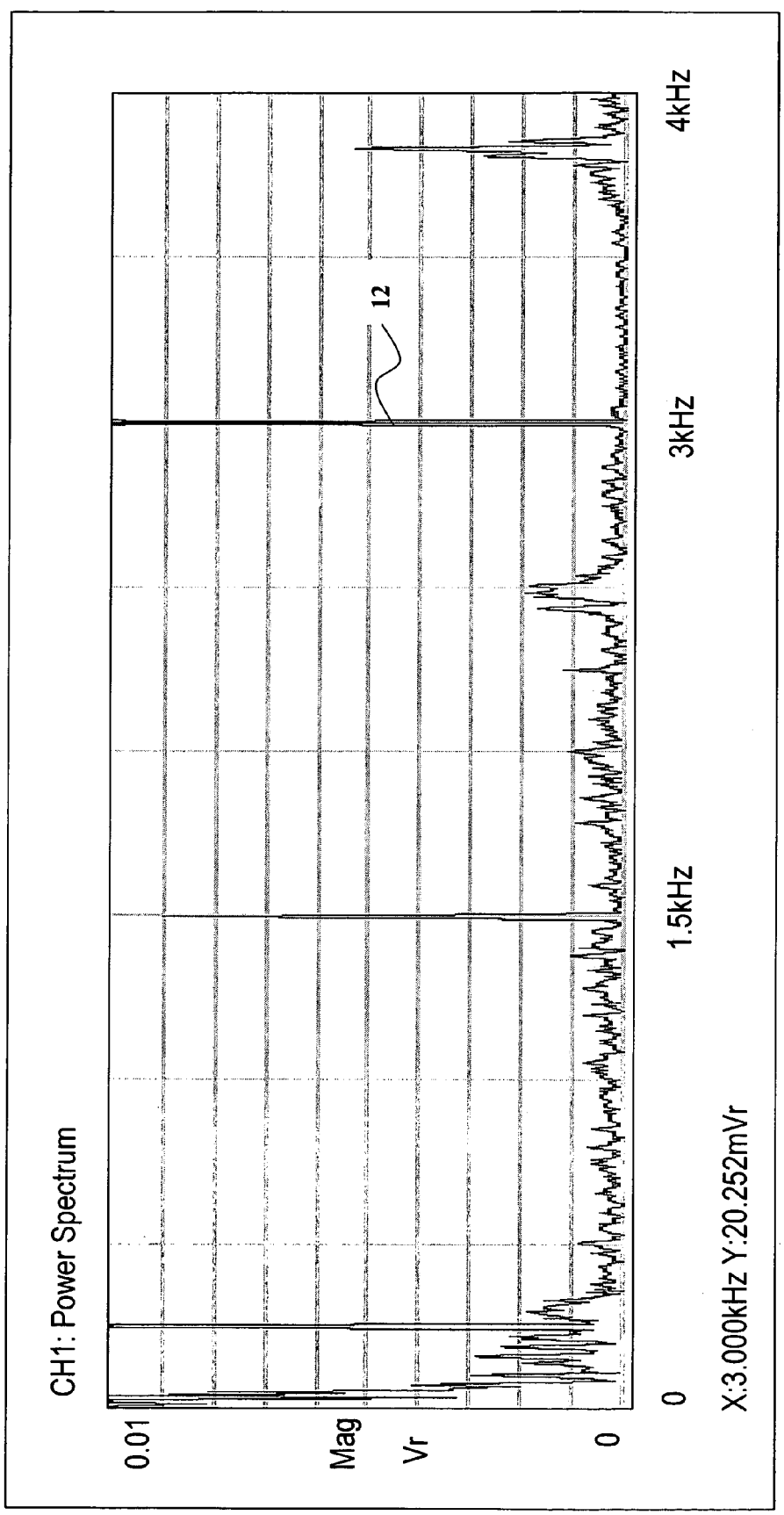
Figure 6:
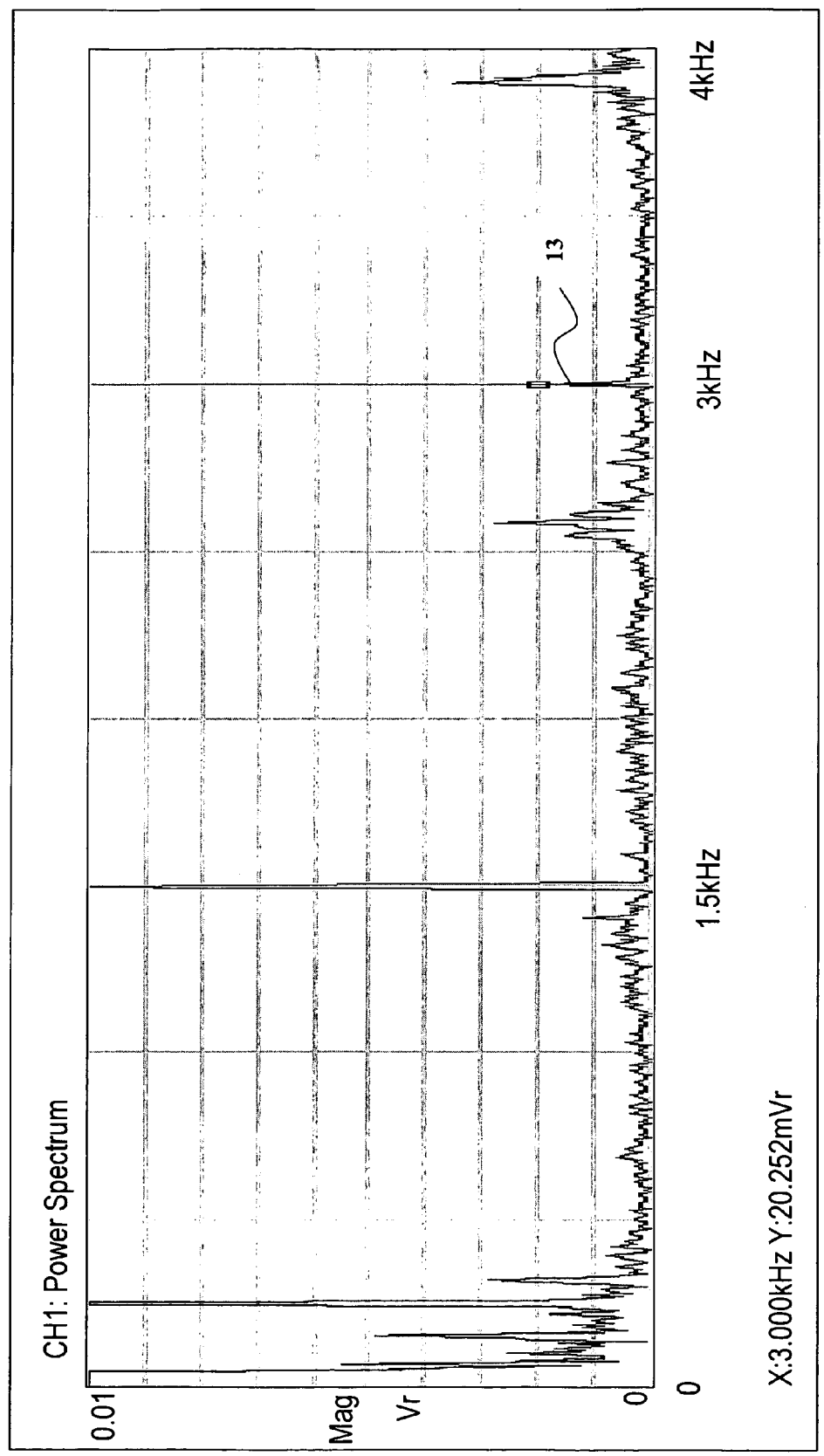
Figure 7:
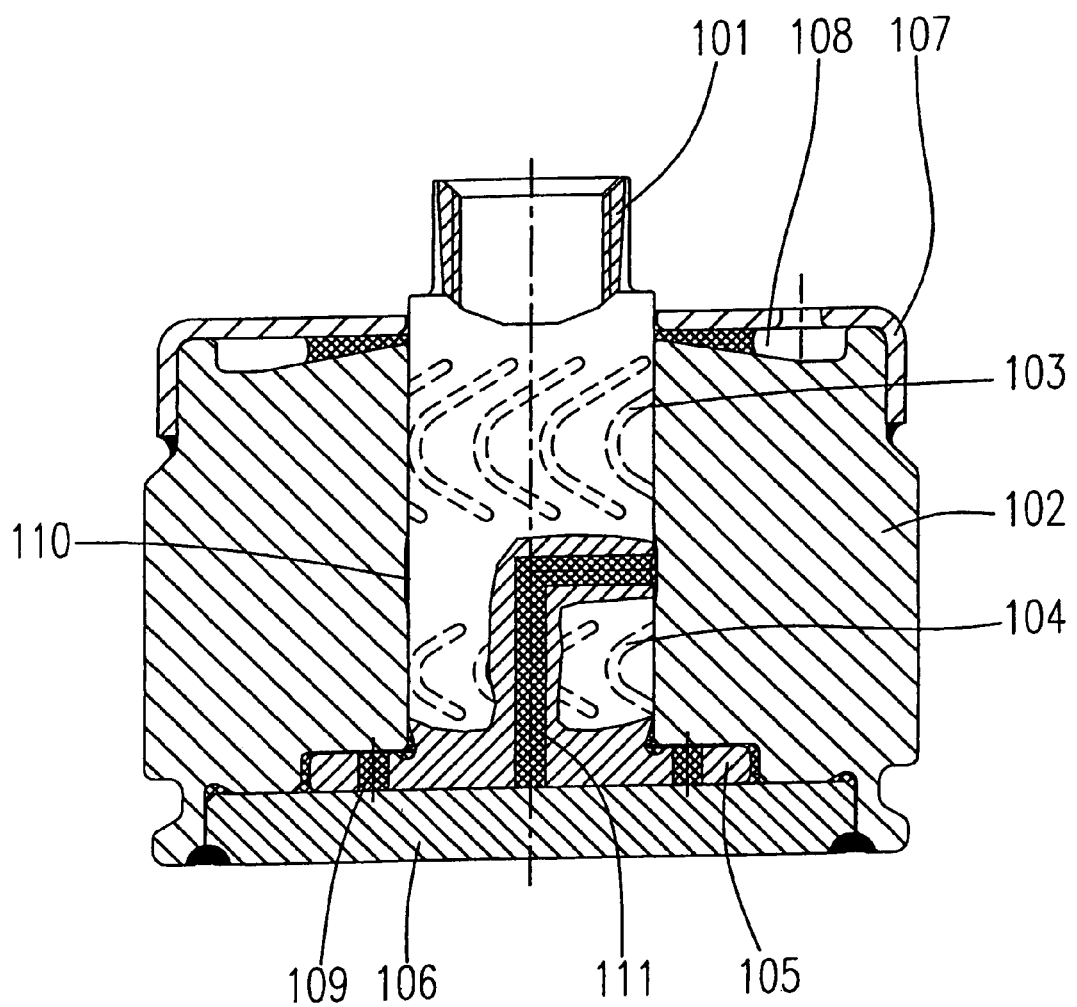
Figure 8:
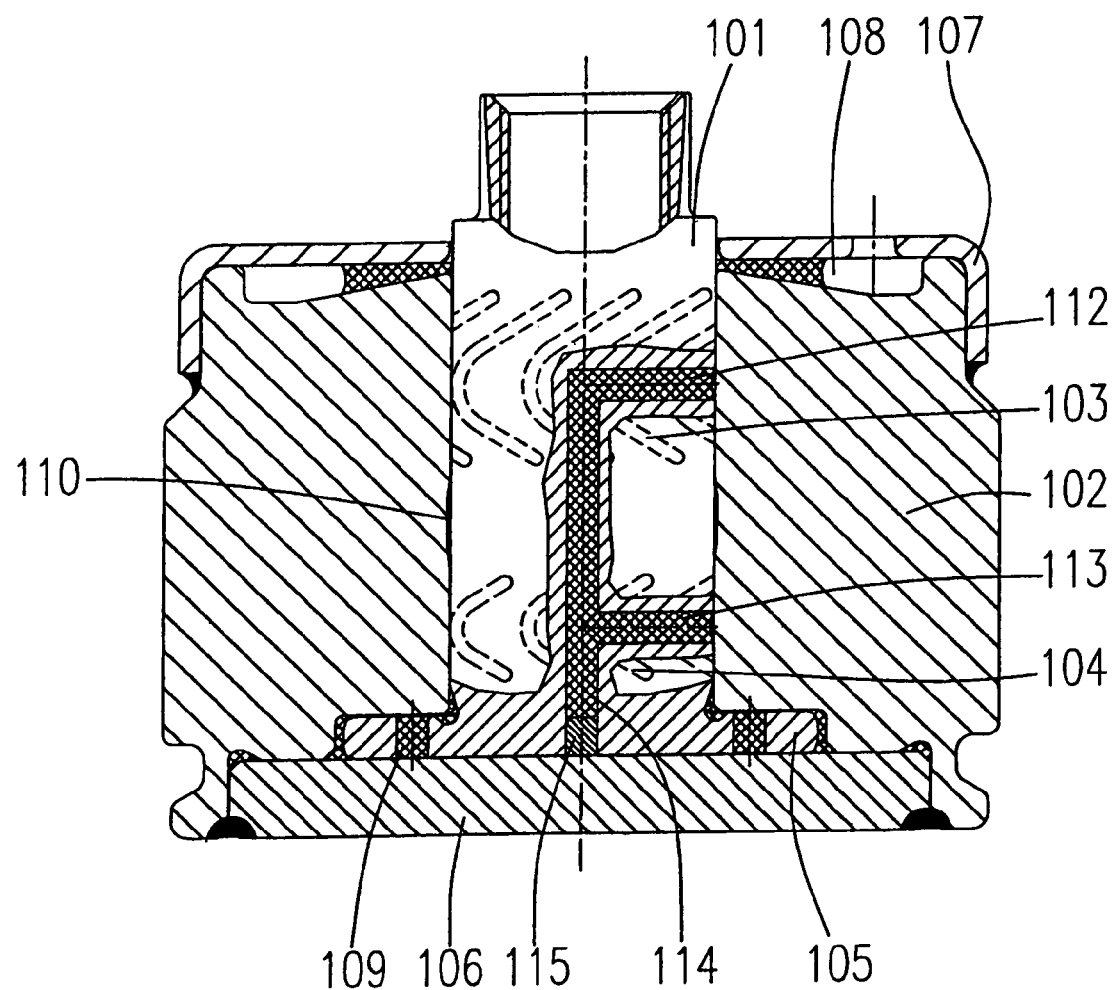
Figure 9:
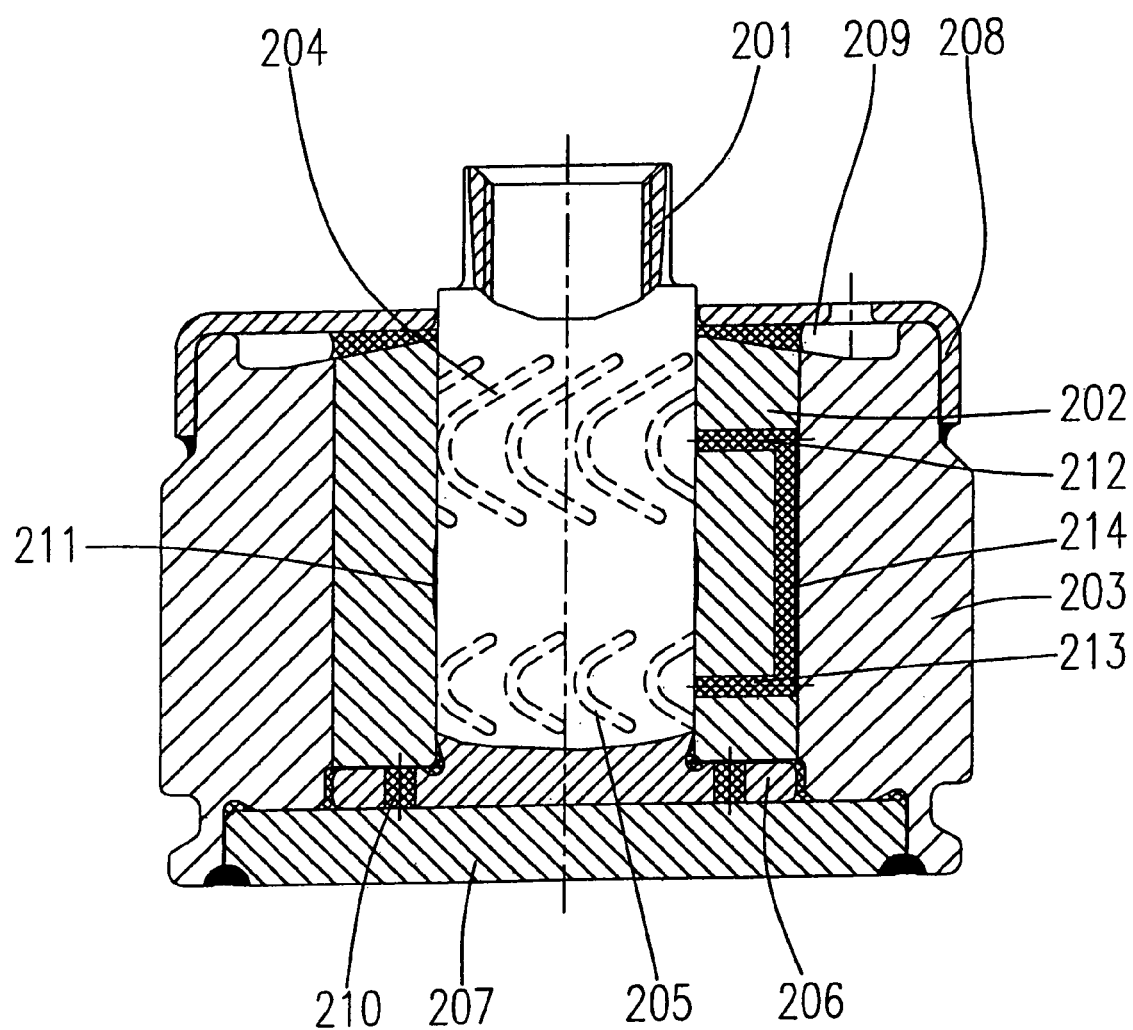
Figure 10:
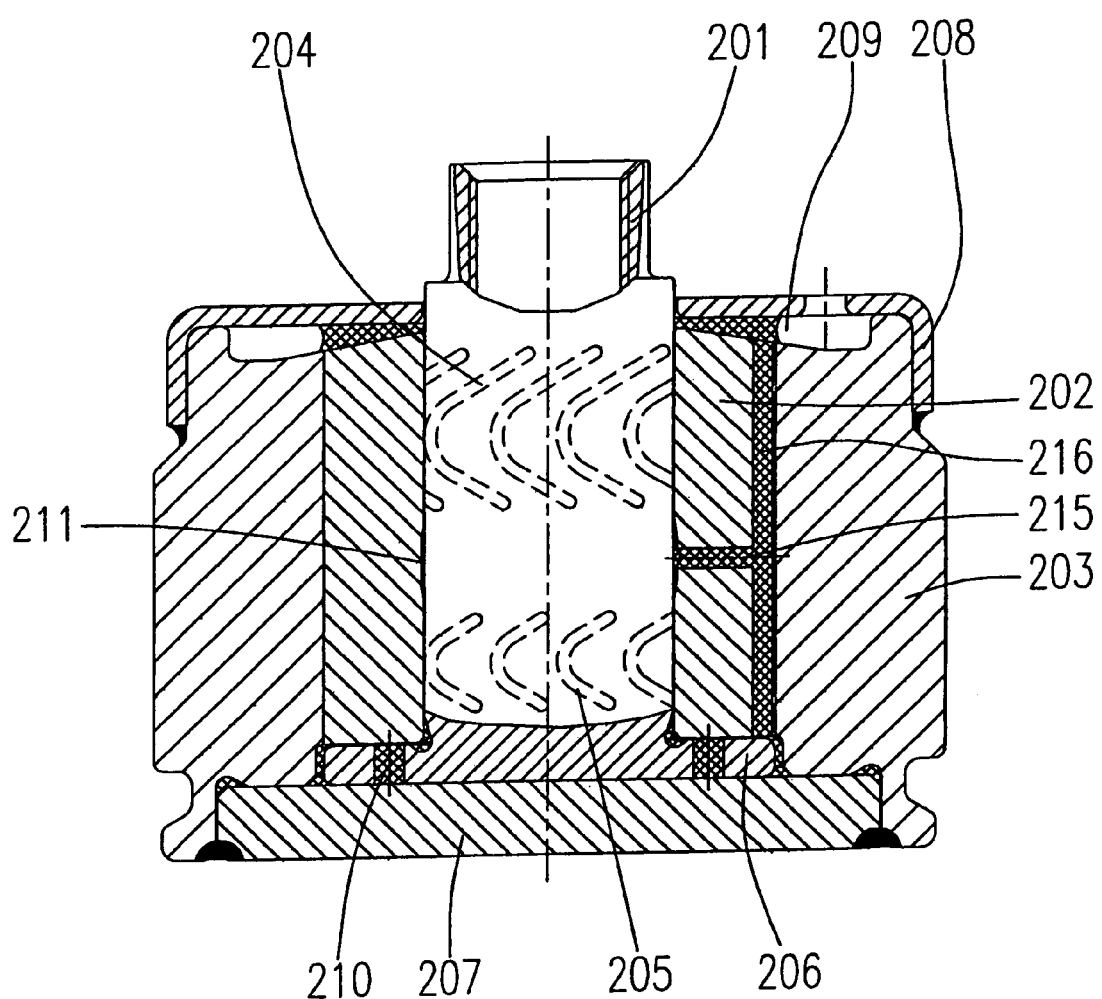

The drawings show:

FIG. 1A: a perspective view of the bearing sleeve;

FIG. 1B: a section through a hydrodynamic bearing arrangement as employed, for example, in spindle motors;

FIG. 1C: a bottom view of the bearing sleeve in direction X of FIG. 1B;

FIG. 2A: the thrust plate in a perspective view;

FIG. 2B: the thrust plate in a view from above;

FIG. 3A: a perspective view of the shaft with thrust plate;

FIG. 3B: a view from above of the shaft with thrust plate;

FIG. 4A: a view from above of the cover plate;

FIG. 4B: a perspective view of the cover plate;

FIG. 5: a diagram of the noise emission spectrum of an electric motor having a hydrodynamic bearing arrangement according to the prior art;

FIG. 6: a diagram of the noise emission spectrum of an electric motor having a hydrodynamic bearing arrangement according to the invention;

FIG. 7: a section through a bearing arrangement according to the invention in a further embodiment;

FIG. 8: a section through a bearing arrangement according to the invention in an embodiment modified vis-à-vis FIG. 7;

FIG. 9: a section through a further embodiment of a bearing arrangement according to the invention;

FIG. 10: a section through an embodiment of the bearing arrangement according to the invention modified vis-à-vis FIG. 9.

DESCRIPTION OF A PREFERRED EMBODIMENT OF THE INVENTION

The embodiment describes a hydrodynamic bearing arrangement according to the invention as employed, for example in a spindle motor.

FIG. 1A shows a bearing sleeve 2 as a central element of the bearing arrangement according to the invention.

According to FIG. 1B, the bearing bush includes a central opening 14 to rotatably accommodate a shaft 1 (FIG. 3A). One of the surfaces facing each other of the shaft 1 and/or bearing bush 2, in the illustrated case, the surface of the bearing bush 2, has cylindrical zones with grooved patterns 3 formed in them.

The bearing bush 2 is provided with an annular recess 15 at its lower end face for the accommodation of a thrust plate 4 (FIG. 2A). The thrust plate 4 is disposed on the shaft 1 and fixedly connected to the shaft (FIG. 3a). Just as the shaft 1 rotates in the bearing bush 2, the thrust plate 4 rotates within the recess 15 of the bearing bush. The lower opening in the bearing bush 2 is hermetically sealed by a cover plate 5 (FIGS. 4A, 4B). The cover plate 5 is seated in a further annular recess 16 in the bearing bush 2 and prevents air from penetrating into the bearing arrangement or lubricant from leaking out of the bearing arrangement.

As can be seen from the view in FIG. 1C, the surface of the bearing sleeve 2 facing a (top) side of the thrust plate 4 has a circular zone worked with a grooved pattern 8 that consists of a number g of herringbone grooves which are distributed evenly over the surface.

Similarly, one of the surfaces facing each other of the thrust plate 4 and/or cover plate 5, in the illustrated example, the surface of the cover plate 5, has a circular zone worked with a grooved pattern 10 (see also FIGS. 4A and 4B). The grooved pattern 10 also comprises a number g of grooves 11 preferably distributed evenly over the surface (or part of the surface) of the cover plate 5.

A fluid, such as air or a liquid lubricant, e.g. oil, is found in a bearing gap formed between the shaft 1 or thrust plate 4 respectively and the bearing sleeve 2 or cover plate 5 respectively. Due to the grooved pattern 3 or 8, 10 respectively on the bearing sleeve 2 and the cover plate 5 as described above, when the shaft 1 or the thrust plate 4 are rotated a pump effect is produced on the lubricant, causing the lubricant to be distributed in the bearing gap and hydrodynamic pressure to be built up within the bearing gap thus enabling the bearing to sustain a load.

The thrust plate 4 is illustrated in detail in FIGS. 2A and 2B. The thrust plate 4 takes the form of an annular disk whose outside diameter is made to fit the inside diameter of the recess in the bearing sleeve 2. According to the invention, the inside diameter of the thrust plate 4, formed by a central hole 6, is punctuated by a number of recesses 7 which are preferably evenly distributed on the inside diameter of the thrust plate. In the illustrated embodiment, five recesses 7 are provided which are used for the direct exchange of lubricant between the two sides of the thrust plate 4.

As shown in FIGS. 3A and 3B, the shaft 1 is led through the opening 6 in the thrust plate 4, the thrust plate 4 being secured to the shaft 1 in a pressfit for example. As can particularly be seen from FIG. 3B, for the thrust plate 4 disposed on the shaft 1, the recesses 7 ensure that a fluid-carrying connection remains between the two sides of the thrust plate 4. These recesses 7 allow the lubricant to flow unimpeded from the upper region of the axial bearing to the lower region of the axial bearing and vice versa.

A detailed view of the cover plate 5 is shown in FIGS. 4A and 4B. The cover plate 5 together with the thrust plate 4 forms the lower axial or thrust bearing of the bearing system and is provided with a grooved pattern 10 that is formed from a number of herringbone grooves 11. In the example according to the invention, the grooved pattern 10 consists of twelve grooves 11 evenly distributed over an outer annular surface of the cover plate 5.

According to the invention, it is now important to choose the number g of grooves in the cover plate 5 so that they cannot be integrally divided by the number h of recesses in the thrust plate and vice versa. Another condition that goes to restrict the pairs of numbers (g, h) even further provides that the number of recesses in the thrust plate (here five) and the number of grooves in the cover plate (here twelve) do not have a common integral divisor except for the digit 1.

In each of the FIGS. 5 and 6, a noise emission spectrum for electric motors having hydrodynamic bearing arrangements is shown. FIG. 5 shows the emission spectrum of a spindle motor having a hydrodynamic bearing according to the prior art, the bearing having three recirculation holes and twelve grooves. As already mentioned at the outset, at 15,000 revolutions/minute, this produces a pure tone at a frequency of 3 kHz, which is expressed in a very large amplitude value 12.

In comparison to this, the emission spectrum of a spindle motor having a bearing according to the invention is shown in FIG. 6 in which five holes and twelve grooves are used, i.e. h=5 and g=12. It can be seen that compared to FIG. 5, at a frequency of 3 kHz no distinctive amplitude value 13 is apparent, but rather that the noise emission is greatly reduced at 3 kHz, while the remaining frequencies of the emission spectrum remain approximately the same compared to FIG. 5. There is consequently a significant reduction in the overall noise emission, particularly at the unpleasantly high frequency of 3 kHz.

FIG. 7 shows a bearing arrangement according to the invention in which an appropriate recirculation hole is provided within the shaft 101. The shaft is enclosed by a bearing sleeve 102 and is integrally connected to the thrust plate 105. Radial bearing regions taking the form of grooved patterns 103 and 104 are provided on the shaft. The bearing arrangement is covered at the thrust plate 105 end by a cover plate 106. The bearing sleeve is covered from the top by a lid 107. A supply volume 108 is disposed in the conventional way between the upper surface of the bearing sleeve 102 and the lid 107, the supply volume being partially filled with bearing fluid and connected to the bearing gap so that bearing fluid can continue to flow into the bearing gap as required. Instead of recesses being provided in the thrust plate 105 for recirculation purposes, recirculation holes 109 are now directly provided.

Between the radial bearing regions 103, 104, the outer circumference of the shaft 101 and/or the inner circumference of the bearing sleeve 102 now has a slight depression taking the form of an annular notch 110. From this annular notch, at least one recirculation hole extends radially inwards into the shaft 102, to transform preferably in the region of the rotational axis into a longitudinal hole which runs into the axial bearing region between the underside of the thrust plate 105 and the topside of the cover plate 106. This hole 111 goes to ensure the circulation of the bearing fluid between the radial bearing regions and the lower axial bearing region.

FIG. 8 shows a modified embodiment of the bearing arrangement vis-à-vis the embodiment shown in FIG. 7, the same parts being provided with the same reference numbers. In contrast to the embodiment according to FIG. 7, in FIG. 8 a recirculation hole that consists of several sections is provided in the shaft 101. At least one upper transversal hole 112 extends from the upper radial bearing region 103 into the rotational center of the shaft. And similarly at least one lower transversal hole 113 extends from the lower radial bearing region 104 into the rotational center of the shaft. The two transversal holes 112 and 113 are connected to each other by a longitudinal hole 114, allowing bearing fluid to circulate between the two radial bearing regions 103, 104 via these holes 112, 113 and 114. The longitudinal hole can be closed from below in the direction of the axial bearing region by a stopper 115 so that the circulation of the bearing fluid through the holes provided in the shaft takes place solely between the radial bearing regions.

FIG. 9 shows another embodiment of the bearing arrangement according to the invention, in which an appropriate recirculation hole is provided in the bearing sleeve. The shaft 201 is enclosed by an inner bearing sleeve 202 and an outer bearing sleeve 203 and includes an upper radial bearing region 204 as well as a lower radial bearing region 205, which are marked by appropriate grooved patterns. The thrust plate 206 is again designed as an integral part of the shaft 201 and is covered from below by the cover plate 207. The upper region of the bearing sleeves 202, 203 is sealed by a lid 208, a supply volume 209 remaining between the bearing sleeves and the lid that is proportionately filled with bearing fluid. The thrust plate has recirculation holes 210 that ensure the circulation of the bearing fluid between the upper and the lower axial bearing region. A small supply volume for the bearing fluid is defined by an annular notch 211 disposed in the inner bearing sleeve 202. The recirculation hole in the inner bearing sleeve 202 includes at least a first transversal hole 212, which, starting from the upper radial bearing region 204, ends in a longitudinal hole 214 which in turn ends in the lower radial bearing region 205 via at least one transversal hole 213. These holes 212, 213 and 214 allow the circulation of bearing fluid between the radial bearing regions 204 and 205.

FIG. 10 shows a modified embodiment of the bearing arrangement vis-à-vis the embodiment shown in FIG. 9, the same components appearing in FIG. 9 being provided with the same reference numbers. In contrast to FIG. 9, the recirculation hole within the bearing sleeve 202 comprises at least one transversal hole 215, which extends from the annular notch 211 and ends in a longitudinal hole 216, one end of the longitudinal hole 216 ends in the supply volume 209, whereas the other end of the longitudinal hole ends in the upper axial bearing region between the bearing sleeve 202 and the thrust plate 206. The holes 215 and 216 thus allow the circulation of bearing fluid between the supply volume 209, the radial bearing regions 204 and 205 as well as the upper axial bearing region.

IDENTIFICATION REFERENCE LIST

1 Shaft
2 Bearing bush
3 Grooved pattern (bearing bush)
4 Thrust plate
5 Cover plate
6 Opening
7 Recesses
8 Grooved pattern (bearing sleeve)
9 Grooves
10 Grooved pattern (cover plate)
11 Grooves
12 Amplitude value
13 Amplitude value
14 Opening
15 Recess
16 Recess
101 Shaft
102 Bearing bush
103 Grooved pattern (radial bearing region)
104 Grooved pattern (radial bearing region)
105 Thrust plate
106 Cover plate
107 Lid
108 Supply volume 109 Recirculation holes
110 Annular notch
111 Hole
112 Transversal hole
113 Transversal hole
114 Longitudinal hole
115 Stopper
201 Shaft
202 Bearing bush (inner)
203 Bearing bush (outer)
204 Grooved pattern (radial bearing region)
205 Grooved pattern (radial bearing region)
206 Thrust plate
207 Cover plate
208 Lid
209 Supply volume
210 Recirculation holes
211 Annular notch
212 Transversal hole
213 Transversal hole
214 Longitudinal hole
215 Transversal hole
216 Longitudinal hole
g, g' Number of grooves
h, h' Number of recesses/holes

The invention claimed is:

1. A hydrodynamic bearing arrangement for an electric spindle motor, the bearing arrangement comprising a shaft (1), a bearing bush (2) and a thrust plate (4) disposed fixedly on the shaft, the shaft and the thrust plate rotating with respect to the bearing bush, and grooved patterns (8;10) to generate fluid-dynamic pressure being provided on the thrust plate and/or the surfaces located opposite the thrust plate of the bearing sleeve (2) and/or a cover plate (5), and each grooved pattern (8;10) comprising a total number g of grooves (9; 11) distributed over the surface of the thrust plate, the bearing sleeve or the cover plate, and in the shaft and/or in the thrust plate, a total number h of holes and/or recesses (7) being provided at an inner edge of the thrust plate and/or at an outer edge of the shaft, wherein the number g of grooves (11) cannot be integrally divided by the number h of recesses (7) or holes and that h cannot be integrally divided by g, characterized in that the greatest common divisor (GCD) of the natural number g and h is the digit 1.

2. A hydrodynamic bearing arrangement according to claim 1, characterized in that the greatest common divisor of the pairs of number g+1, h and g−1, h and g, h+1 and g, h−1 is always 1.

3. A hydrodynamic bearing arrangement according to claim 1, characterized in that the grooves (9; 11) are evenly distributed on at least one part of the surface of the thrust plate (4) or the bearing sleeve (2) or the cover plate (5).

4. A hydrodynamic bearing arrangement according to claim 1, characterized in that the recesses (7) are evenly distributed over an inner circumference of the thrust plate (4) or an outer circumference of the shaft (1).

5. A hydrodynamic bearing arrangement according to claim 1, characterized in that the holes are evenly distributed over a circular line on the thrust plate (4) substantially concentric to the rotational axis of the shaft (1).

6. A hydrodynamic bearing arrangement according to claim 1, characterized in that the overall surface area of the cross-section of all of the recesses (7) or holes combined remains constant independently of the number h of recesses or holes.

7. A hydrodynamic bearing arrangement according to claim 1, characterized in that both the holes or recess and the grooved patterns are on separate surfaces.

* * * * *